United States Patent
Eastman et al.

(10) Patent No.: US 7,354,316 B1
(45) Date of Patent: Apr. 8, 2008

(54) CATEGORY 5E COMPLIANT PATCH PANEL

(75) Inventors: Mark Eastman, Eldersburg, MD (US); Gregory K. Sherrill, Herndon, VA (US)

(73) Assignee: Verizon Services Corp., Arlington, VA (US)

( * ) Notice: Subject to any disclaimer, the term of this patent is extended or adjusted under 35 U.S.C. 154(b) by 87 days.

(21) Appl. No.: 11/355,168

(22) Filed: Feb. 16, 2006

(51) Int. Cl.
*H01R 24/00* (2006.01)

(52) U.S. Cl. .................................................. 439/676

(58) Field of Classification Search ................ 439/676, 439/502, 941; 348/552, 143
See application file for complete search history.

(56) References Cited

U.S. PATENT DOCUMENTS

| | | | |
|---|---|---|---|
| 5,593,317 A * | 1/1997 | Humbles | 439/502 |
| 6,206,734 B1 * | 3/2001 | Liu | 439/676 |
| 7,087,840 B2 * | 8/2006 | Herring et al. | 174/101 |
| 7,221,389 B2 * | 5/2007 | Ahern et al. | 348/192 |
| 2004/0252239 A1 * | 12/2004 | Niiyama | 348/561 |
| 2005/0248653 A1 * | 11/2005 | Hoang | 348/143 |
| 2006/0034180 A1 * | 2/2006 | Gellerman et al. | 370/241 |

\* cited by examiner

*Primary Examiner*—Chandrika Prasad

(57) ABSTRACT

A patch panel that provides a more flexible test bed for copper based broadband services using male or female pin-type connectors (commonly referred to as "telco" or "champ" connectors) that meets ANSI/T1A/E1A-568-B.2 standards is disclosed. The connectors, depending upon whether they are male or female, have a pin or receptacle, respectively, for each conductor that comprises the pairs of a Cat5e compliant cable assembly. The patch panel provides a "cleaner" installation in systems requiring Cat5e compliance as cables are routed to a centralized point (the patch panel) for distribution to and from communications devices and network elements.

18 Claims, 4 Drawing Sheets

CATEGORY 5E COMPLIANT PATCH PANEL

BACKGROUND INFORMATION

The ANSI/TIA/EIA-568 series of standards and their addendums and annexes, which are all fully incorporated herein and made a part hereof, describe the minimum standard for cabling installations. The original Category 5 standard from the TIA was called ANSI/TIA/EIA 568-A, and several addenda have been added to the main standard since its ratification in 1995. Category 5 Enhanced (Cat5e) is now the minimum standard for all new cabling installations, offering additional headroom over its predecessor, Category 5. The new family of cabling standards is known as ANSI/TIA/EIA 568-B. This standard currently has three sections. ANSI/TIA/EIA 568-B.1 covers the requirements of copper cabling systems, including definitions of the permanent link (different to the TIA 568-A Basic Link configuration) and channels. ANSI/TIA/EIA 568-B.2 covers copper cabling components, including cable, connectors, and patch cords. ANSI/TIA/EIA 568-B.3 covers fiber optic cabling systems and components. The performance criteria specified within the new Cat5e standard exceeds Category 5, though it remains a 100 MHz standard.

The main differences between Category 5 and Category 5e can be found in the specifications. The performance requirements have been raised slightly in the new standard. Cat5e has stricter specifications for Power Sum Equal-Level Far-End Crosstalk (PS-ELFEXT), Near-End Crosstalk (NEXT), Attenuation, and Return Loss (RL) than those for Category 5. Like Cat5, Cat5e is a 100-MHz standard, but it has the capacity to handle bandwidth superior to that of Cat5. Near-End Crosstalk (NEXT) occurs in wires packed together within a cable when portions of the signals launched on wires at one end of the cable leak into other wires at the same end, potentially disturbing the weaker signals received on those wires from the opposite end of the cable. Power Sum NEXT (PS-NEXT) is the sum of the NEXT power coupled to a wire pair from all other adjacent pairs. ELFEXT is a test parameter used when testing Category 5E UTP (unshielded twisted-pair), FTP (foil screen twisted-pair) or ScTP (screened twisted-pair) Permanent Links or channels. ELFEXT is the crosstalk from a signal transmitted on a pair at one end of the cable, measured on another disturbed pair at the opposite end from which the disturbing signal is transmitted, normalized by the attenuation contribution of the cable or cabling. The larger the value of ELFEXT loss in dB, the better the performance. PS-ELFEXT is the composite sum of all of the ELFEXT signals.

Table I compares the twisted-pair specifications of Cat5 and Cat5e.

TABLE I

| Parameter | CAT5 | CAT5e |
| --- | --- | --- |
| Frequency | 100 MHz | 100 MHz |
| Attenuation (min. at 100 MHz) | 22 dB | 22 dB |
| Characteristic Impedance | 100 ohms +/− 15% | 100 ohms +/− 15% |
| NEXT (min. at 100 MHz) | 32.3 dB | 35.3 dB |
| PS-NEXT (min. at 100 MHz) | (no specification) | 32.3 dB |
| ELFEXT (min. at 100 MHz) | (no specification) | 23.8 dB |
| PS-ELFEXT (min. at 100 MHz) | (no specification) | 20.8 dB |
| Return Loss (min. at 100 MHz) | 16 dB | 20.1 dB |
| Delay Skew (max. per 100 m) | (no specification) | 45 ns |

As described above, Cat 5e cable is an enhanced version of Cat 5 for use with 1000BASE-T (gigabit) networks, or for long-distance 100 Base-T links (350 m, compared with 100 m for Cat 5). Because of the longer distances associated with Cat5e, it is advantageous to be able to connect Cat5e-rated cables together while still maintaining compliance with the standard. One way to do this is through a patch panel that meets the Cat5e standards.

BRIEF DESCRIPTION OF THE DRAWING(S)

DETAILED DESCRIPTION OF PREFERRED EMBODIMENTS

Figure 1:
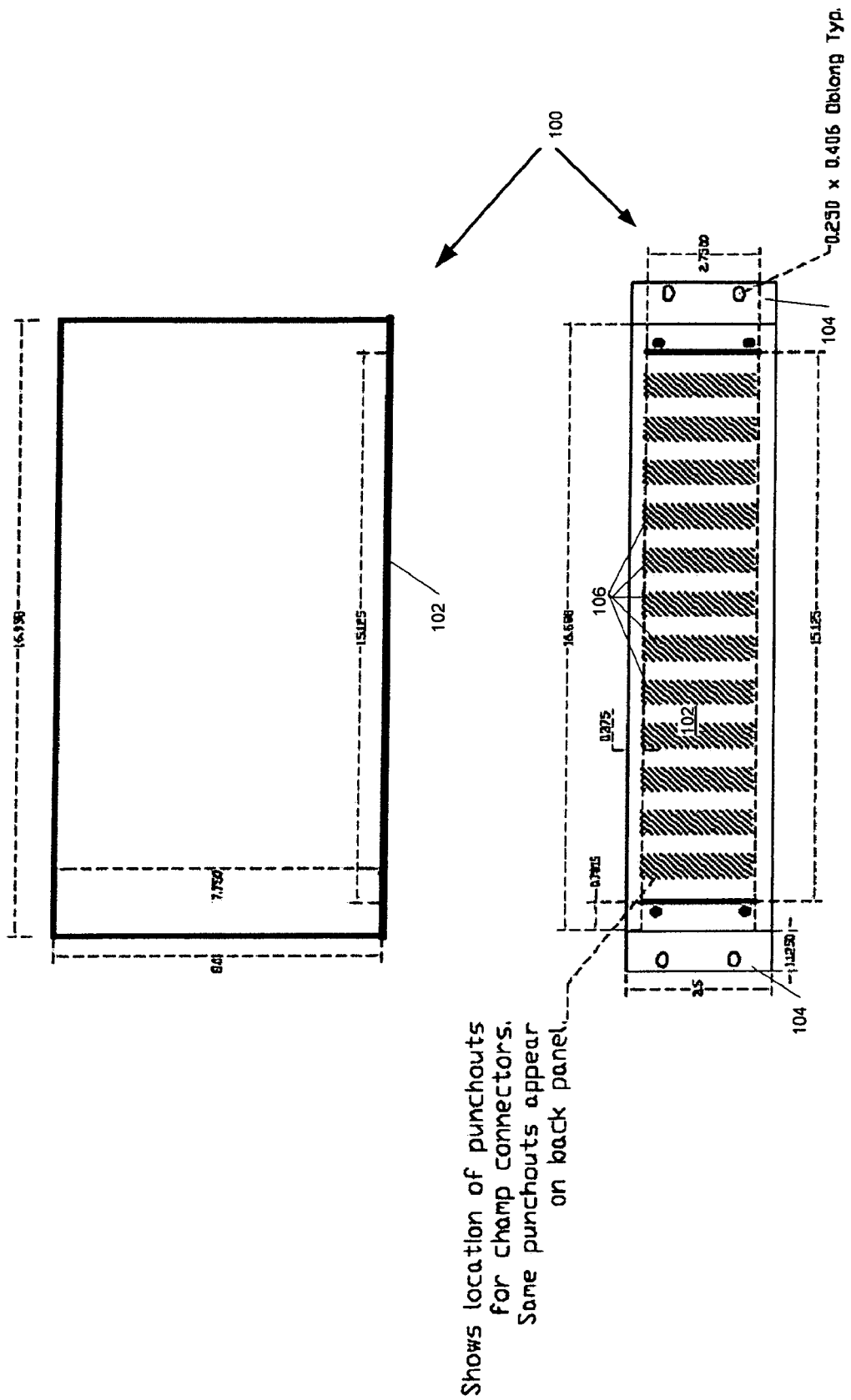
FIG. 1 illustrates one embodiment of a box that comprises the structure of a patch panel. according to the present invention.

The preferred embodiments implemented according to the present invention now will be described more fully with reference to the accompanying drawings, in which some, but not all possible embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

The preferred embodiments according to the present invention create a patch panel that provides a more flexible test bed for copper based broadband services using male or female pin-type connectors (commonly referred to as "telco" or "champ" connectors) as are manufactured by Amphenol Corporation of Wallingford, Conn.; Lucent Technologies, Inc. of Murray Hill, N.J., and Systimax Solutions (a division of CommScope, Inc. of Hickory, N.C.), among others. The connectors, depending upon whether they are male or female, have a pin or receptacle, respectively, for each conductor that comprises the pairs of a Cat5e compliant cable assembly. The embodiments of the patch panel according to the present invention are certified to ANSI/T1A/E1A-568-B.2 standards in order to be used effectively for noise measurements, and rate and reach testing. The embodiments according to the present invention results in a "cleaner" installation as cables are routed to a centralized point (the patch panel) for distribution.

A preferred embodiment according to the present invention allows two male cables with male 50-pin champ-style connectors to be joined with a minimum of Near End Cross-Talk (NEXT) introduced by the panel. It is to be appreciated that cables having different pair-counts and connectors with corresponding pin counts are contemplated within the scope of this invention. In the preferred embodiment, the panel accommodates a minimum of 8 and a maximum of 12 female champ-style connections per side (input/output), though it is to be appreciated that any number of connectors are contemplated within the scope of the invention. In the preferred embodiment according to the invention, the panel is manufactured to fit in either a 19" or 23" standard network bay and ears may be provided for a 23" application. These sizes are contemplated for fitting standard-size network racks and it is to be appreciated that other sizes fall within the scope of the embodiments of this invention. The panel enclosure is deep enough to allow for a short length of Cat5e complaint cable (UTP, FTP or ScTP) to be used between the internal connectors and wired to Category 5e specifications. Preferably, the enclosure does not exceed 12" in depth and an 8" depth is preferred so as to fit in stand racks of rack-mount equipment, though other depths are contemplated under the scope of this invention. The connectors and the internal wiring of the patch panel meet or exceed Category 5e specifications both in installation and design.

A preferred embodiment according to the present invention is a panel comprised of a metal box, though non-metallic or combinations of metallic and non-metallic materials may also be used. The panel is further comprised of "ears" for attaching it to a standard 19" rack and also may have extensions so that the panel will fit in a standard 23" telco rack. On one or more sides of the box, but preferably the front and rear are connectors such as, for example, female bulkhead "champ" connectors, though other connectors are contemplated under the scope of this invention, including male connectors and male and female connectors on the same box. All connectors are Cat5e certified. Pairs of the connectors that are mounted on the box are electrically connected internally by wiring them straight through (pin 1 to pin 1 etc.) such that Cat5e noise and impedance specifications are maintained by maintaining the twisted, unshielded cable within its jacket and isolating the wires to the industry standard for Category 5 Ethernet. It is to be appreciated that unshielded as well as shielded twisted pair cable may be used in embodiments according to the invention. In one embodiment, the panel measures 3.5" h×19" w×12" d, and has 8-12 connections on each side and is fully enclosed and labeled with port numbering and manufacturer/model information. The connections may be installed vertically allowing for external cable connections at 90 or 180 degrees.

FIG. 1 illustrates an embodiment of the box 100 that comprises the patch panel. In this embodiment, a box is fabricated from material that is 0.125" thick, though materials of other thicknesses may be used. While the box 100 is generally comprised of one or more metals such as aluminum or steel, other non-metallic materials such as plastics may be used. The box of FIG. 1 has the external dimensions of 16.688 inches wide, 8.00 inches deep, and 3.5 inches high. On one face (the front face 102) are "ears" 104 for rack-mounting the box 100. One or more areas 106 of the material that comprise the box are punched or cut-out to accommodate cable connectors. The embodiment of FIG. 1 shows 12 such punch-outs 106 on the front face 102 of the box 100, though more or fewer punch-outs 106 may be accommodated. While these punch-outs may only be found on one face of the box 100, there generally will be corresponding punch-outs located on two of the parallel sides of the box 100 so that two corresponding connectors can be wired "straight through." It is to be appreciated that this is only one embodiment according to the invention and other embodiments may be comprised of boxes having different dimensions, materials and numbers of connectors.

Figure 2:
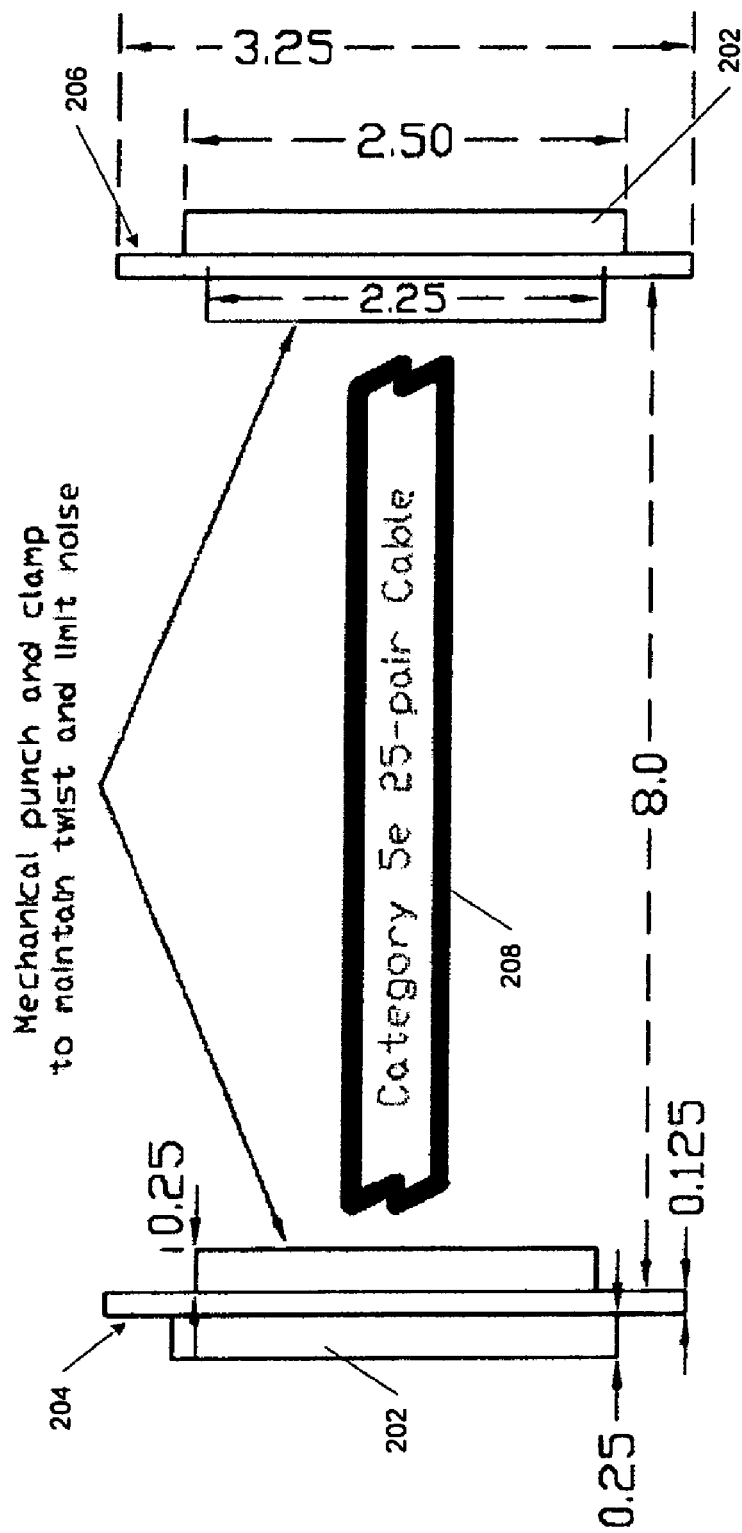
FIG. 2 is an illustration of the electrical connection between a pair of connectors in an embodiment of the patch panel according to the present invention.

FIG. 2 is an illustration of the electrical connection between a pair of connectors in an embodiment of the patch panel. In FIG. 2, a female champ-type connector 202 installed on a front face 204 of the box 100 that comprises the panel is electrically connected using 25-pair, Category 5e twisted, unshielded cable 208 to a female champ-type connector 202 mounted on a back face 206 of the box 100. In a preferred embodiment according to the invention, the connectors are Systimax model 525-JA-003 connectors that interface with cables terminated with Systimax model 525-AP-003 plugs, though it is to be appreciated that other connectors may be used. The cable 208 is properly clamped at each connector 202 to help prevent unwinding of the twists and to maintain Cat5e compliance. While the cable 208 shown in FIG. 2, is UTP, in other embodiments shielded cable may be used. If the cable 208 is shielded, the shield is connected at one end to a ground plane. In the embodiment of FIG. 2, the connectors 202 are separated by a distance of 8.00 inches, as is shown in FIG. 1. It is to be appreciated that cables with different pair counts (e.g., 32-pair, etc) with the appropriate connectors, unshielded twisted pair, and cables of lengths different than 8.00 inches are contemplated within the scope of this invention.

Figure 3:
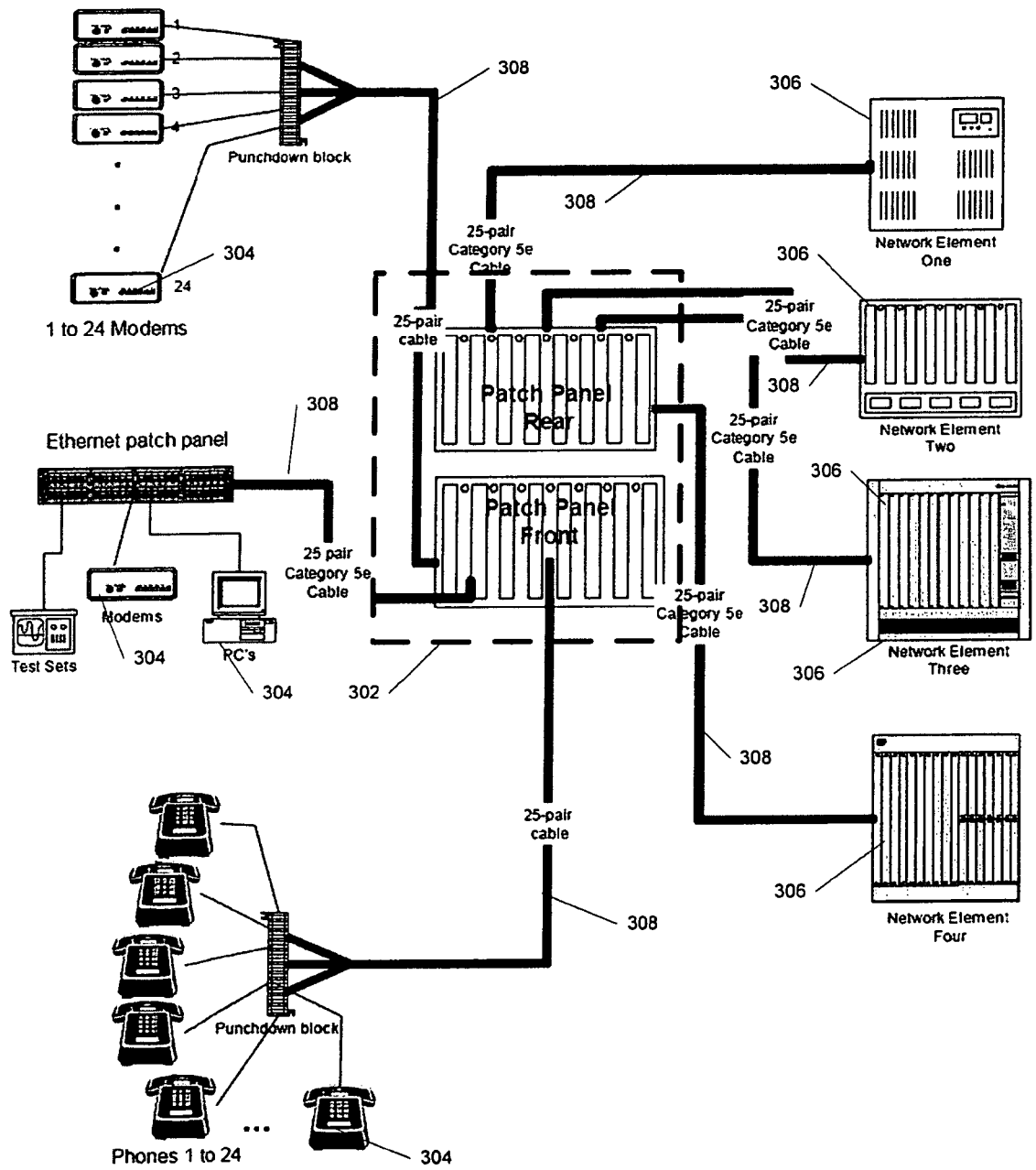
FIG. 3 illustrates an exemplary system for implementing a preferred embodiment according to the present invention.

FIG. 3 illustrates an exemplary system for implementing a preferred embodiment according to the present invention. The exemplary system of FIG. 3 illustrates the typical use of a 25-pair (50-pin) male "champ" connector patch panel in a network test environment. In this system, a patch panel 302 provides an interface for connecting various system components. The patch panel 302 provides a convenient, quick and neat way to connect various communications devices 304 to network elements 306. Communications devices 304 may include, for example, modems, personal computers, telephones, etc. Network elements 306 may include, for example, digital subscriber line access multiplexers (DSLAM's), switches, routers, multiplexers, etc., as are known in the art. The system maintains Cat5e compliance from the communications devices 304 through the patch panel 302, to the network elements 306. By connecting the network elements 306 to the rear of the patch panel using Cat5e rated cabling 308, rearrangements can be made to the test bed configuration in front of the panel 302 without the need for wire-wrapping or punching down the pairs, while maintaining very low noise insertion.

Figure 4:
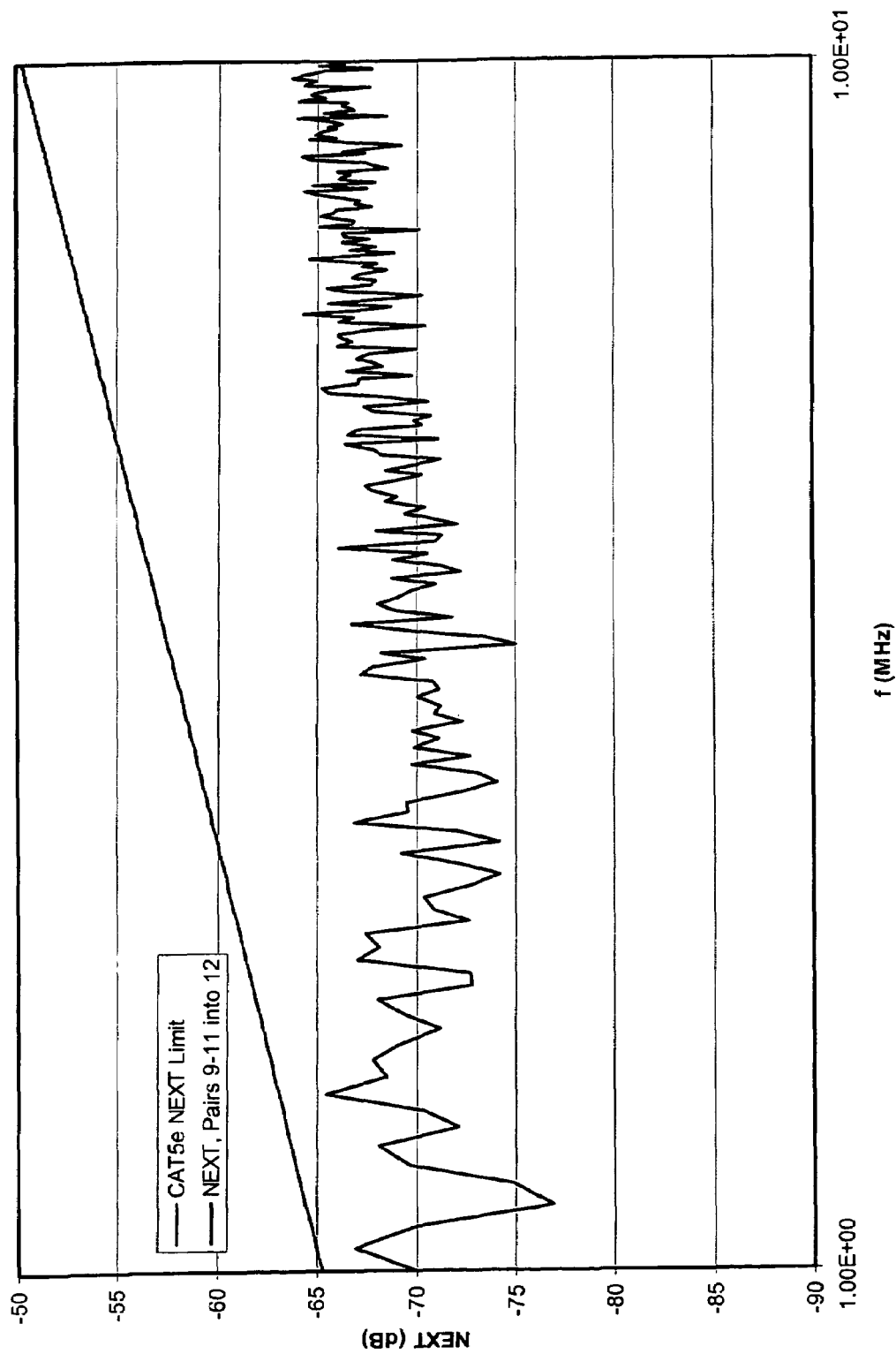
FIG. 4 is a test result showing the NEXT inserted on a twisted pair in a Cat5e compliant cable that is attached to an embodiment of a patch panel according to the present invention.

FIG. 4 is a test result showing the NEXT inserted on a twisted pair in a Cat5e compliant cable that is attached to an embodiment of a patch panel according to the present invention. The limit of NEXT for Cat5e compliance is shown over a signal range from 1 MHz to 10 MHz, as such signal is inserted over three pairs (pairs 9-11) of a 10-foot long, 25-pair Cat5e rated cable. The cable is, in turn, connected to an embodiment of the patch panel according to the present invention. One of the pairs (pair 12) is monitored for NEXT as the frequency of the signal is increased. As shown in FIG. 4, the cable and patch panel meets Cat5e compliance requirements for NEXT over the given signal frequency range.

Modifications and Alternative Embodiments

Many modifications and other embodiments will come to mind to one skilled in the art having the benefit of the teachings presented in the foregoing descriptions of the preferred embodiments. For instance, the connectors used on the patch panel may be male, female or combinations of male and female so long as they are Cat5e compliant. Furthermore, the patch panel may be in various configurations, some of which aren't shown in the accompanying figures. Accordingly, it should be understood that the invention is not to be limited to the specific embodiments described herein, but rather to the appended claims, and that modifications and other embodiments are intended to be included within the scope of the appended claims. Although specific terms are employed herein, they are used in an inclusively descriptive sense only and not for purposes of limitation.

What is claimed is:

1. A system comprising:
a structure having at least a first side and a second side;
two or more Cat5e compliant electrical connectors mounted to the structure;
a segment of Cat5e compliant cable, having a first end and a second end, that electrically connects each of the two or more Cat5e compliant connectors, mounted to the at least first side of the structure, to another of the two or more Cat5e compliant connectors, mounted to the at least second side of the structure, to form an assembly of the Cat5e compliant cable and two Cat5e compliant connectors mounted to the structure,
wherein the first end is clamped to each of the two or more Cat5e compliant connectors mounted on the at least first side of the structure and the second end is clamped to the another of the two or more Cat5e compliant connectors mounted to the at least second side of the structure so as to securely hold the first and second ends to the respective Cat5e compliant connectors,
wherein one or more of said assemblies are configured to form a patch panel such that said patch panel conforms to Cat5e requirements for at least near-end cross talk (NEXT).

2. The system of claim 1, wherein said Cat5e compliant connectors are female champ-style connectors.

3. The system of claim 1, wherein said Cat5e compliant connectors are male champ-style connectors.

4. The system of claim 1, wherein said Cat5e compliant connectors are male and female champ-style connectors.

5. The system of claim 1, wherein said Cat5e compliant connectors are female champ-style connectors designed to accommodate 25-pair Cat5e compliant cable and said segment of Cat5e compliant cable is 25-pair Cat5e compliant cable.

6. The system of claim 1, wherein said Cat5e compliant connectors are male champ-style connectors designed to accommodate 25-pair Cat5e compliant cable and said segment of Cat5e compliant cable is 25-pair Cat5e compliant cable.

7. The system of claim 1, wherein said Cat5e compliant connectors are male and female champ-style connectors designed to accommodate 25-pair Cat5e compliant cable and said segment of Cat5e compliant cable is 25-pair Cat5e compliant cable.

8. The system of claim 1, wherein said Cat5e compliant connectors are female champ-style connectors designed to accommodate 32-pair Cat5e compliant cable and said segment of Cat5e compliant cable is 32-pair Cat5e compliant cable.

9. The system of claim 1, wherein said Cat5e compliant connectors are male champ-style connectors designed to accommodate 32-pair Cat5e compliant cable and said segment of Cat5e compliant cable is 32-pair Cat5e compliant cable.

10. The system of claim 1, wherein said Cat5e compliant connectors are male and female champ-style connectors designed to accommodate 32-pair Cat5e compliant cable and said segment of Cat5e compliant cable is 32-pair Cat5e compliant cable.

11. The system of claim 1, wherein one or more of said assemblies are configured to form a patch panel such that said patch panel conforms to Cat5e requirements for at least near-end cross talk (NEXT), power sum near-end cross talk (PS-NEXT), equal level far-end cross talk (ELFEXT) and power sum equal level far-end cross talk (PS-ELFEXT).

12. A system comprising:
a communications device;
a first Cat5e compliant cable comprised of twisted pairs of conductors and a first end and a second end, each end terminated with a connector that is Cat5e compliant and said first end of said first Cat5e compliant cable is connected to said communications device;
a patch panel comprised of a structure having at least a first side and a second side, two or more panel-mount Cat5e compliant connectors mounted on the at least first side and second side of the structure and each panel-mount Cat5e compliant connector is electrically connected to another panel-mount Cat5e compliant connector such that said patch panel is Cat5e compliant, wherein the second end of said first Cat5e compliant cable is connected to the at least first side of the structure of said patch panel;
a second Cat5e compliant cable comprised of twisted pairs of conductors and a first end and a second end, each end terminated with a connector that is Cat5e compliant and said first end of said second Cat5e compliant cable is connected to the at least second side of the structure of said patch panel;
a network device, wherein said second end of said second Cat5e compliant cable is connected to said network device,
wherein said first Cat5e compliant cable, said patch panel and said second Cat5e compliant cable form an assembly that conforms to Cat5e requirements for at least near-end cross talk (NEXT).

13. The system of claim 12, wherein said two or more panel-mount Cat5e compliant connectors are female champ-style connectors.

14. The system of claim 12, wherein said two or more panel-mount Cat5e compliant connectors are male champ-style connectors.

15. The system of claim 12, wherein said two or more panel-mount Cat5e compliant connectors are male and female champ-style connectors.

16. The system of claim 12, wherein said first and said second Cat5e compliant cables are 25-pair Cat5e compliant cable.

17. The system of claim 12, wherein said first and said second Cat5e compliant cables are 32-pair Cat5e compliant cable.

18. The system of claim 12, wherein said first Cat5e compliant cable, said patch panel and said second Cat5e compliant cable form an assembly that conforms to Cat5e requirements for at least near-end cross talk (NEXT), power sum near-end cross talk (PS-NEXT), equal level far-end cross talk (ELFEXT) and power sum equal level far-end cross talk (PS-ELFEXT).

* * * * *